United States Patent
Zellner et al.

(10) Patent No.: US 7,418,503 B2
(45) Date of Patent: *Aug. 26, 2008

(54) ANONYMOUS LOCATION SERVICE FOR WIRELESS NETWORKS

(75) Inventors: Samuel N. Zellner, Dunwoody, GA (US); Mark J. Enzmann, Roswell, GA (US); Robert T. Moton, Jr., Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 196 days.

This patent is subject to a terminal disclaimer.

(21) Appl. No.: 11/375,849

(22) Filed: Mar. 15, 2006

(65) Prior Publication Data

US 2006/0195570 A1 Aug. 31, 2006

Related U.S. Application Data

(63) Continuation of application No. 10/819,940, filed on Apr. 8, 2004, now Pat. No. 7,069,319, which is a continuation of application No. 09/606,535, filed on Jun. 30, 2000, now Pat. No. 6,738,808.

(51) Int. Cl.
*G06F 13/00* (2006.01)
(52) U.S. Cl. .................... 709/225; 709/217; 709/227
(58) Field of Classification Search ............. 709/217, 709/219, 223, 224, 225, 238, 227
See application file for complete search history.

(56) References Cited

U.S. PATENT DOCUMENTS 4,445,118 A 4/1984 Taylor et al.
(Continued)

FOREIGN PATENT DOCUMENTS

EP 000964542 A2 12/1999
(Continued)

OTHER PUBLICATIONS

U.S. Appl. No. 11/298,419, entitled "System and Method for Using Location Information to Execute an Action" filed Dec. 9, 2005, Inventors: Robert T. Moton Jr.; Mark J. Enzmann; and Samuel N. Zellner.
(Continued)

*Primary Examiner*—Viet Vu
(74) *Attorney, Agent, or Firm*—Merchant & Gould

(57) ABSTRACT

An anonymous location wireless network service for use in a wireless network that tracks the location and identity of network users, such as networks complying with enhanced 911 standards. The service provides content providers with the location of network users without revealing their identities. The service includes a wireless network having a proxy server, a network communication link to a plurality of web sites, and a wireless communication link to a plurality of handheld devices. The proxy server blocks identity by reading the location and identity information of network devices, generating dummy identifications, relating the dummy identifications to the identity information, storing the relationships in a memory storage, and forwarding the location information and dummy identifications to the global computer network. Upon receiving return messages from the global computer network, the proxy server reads the dummy identifications, looks up the related identity information in the memory storage, and forwards the data to the appropriate network devices.

20 Claims, 8 Drawing Sheets

U.S. PATENT DOCUMENTS

| | | | |
|---|---|---|---|
| 4,757,267 A | 7/1988 | Riskin | |
| 5,303,393 A | 4/1994 | Noreen et al. | |
| 5,444,444 A | 8/1995 | Ross | 340/994 |
| 5,511,111 A | 4/1996 | Serbetcioglu et al. | |
| 5,512,908 A | 4/1996 | Herrick | |
| 5,528,248 A | 6/1996 | Steiner et al. | |
| 5,566,235 A | 10/1996 | Hetz | |
| 5,588,042 A | 12/1996 | Comer | |
| 5,596,625 A | 1/1997 | LeBlanc | |
| 5,610,973 A | 3/1997 | Comer | |
| 5,625,364 A | 4/1997 | Herrick et al. | |
| 5,657,375 A | 8/1997 | Connolly et al. | |
| 5,663,734 A | 9/1997 | Krasner | |
| 5,694,453 A | 12/1997 | Fuller et al. | |
| 5,701,301 A | 12/1997 | Weisser, Jr. | |
| 5,712,899 A | 1/1998 | Pace, II | |
| 5,727,057 A | 3/1998 | Emery et al. | |
| 5,771,283 A | 6/1998 | Chang et al. | |
| 5,794,210 A | 8/1998 | Goldhaber et al. | |
| 5,819,155 A | 10/1998 | Worthy et al. | |
| 5,838,774 A | 11/1998 | Weisser, Jr. | |
| 5,852,775 A | 12/1998 | Hidary | 455/412.1 |
| 5,875,401 A | 2/1999 | Rochkind | |
| 5,903,636 A | 5/1999 | Malik | |
| 5,949,867 A | 9/1999 | Sonnenberg | |
| 5,961,593 A | 10/1999 | Gabber et al. | |
| 6,011,975 A | 1/2000 | Emery et al. | |
| 6,028,921 A | 2/2000 | Malik et al. | |
| 6,047,327 A | 4/2000 | Tso et al. | |
| 6,085,086 A | 7/2000 | La Porta et al. | |
| 6,091,956 A | 7/2000 | Hollenberg | |
| 6,101,381 A | 8/2000 | Tajima et al. | 455/414.2 |
| 6,112,186 A | 8/2000 | Bergh et al. | |
| 6,122,520 A | 9/2000 | Want et al. | |
| 6,133,853 A | 10/2000 | Obradovich et al. | |
| 6,138,003 A | 10/2000 | Kingdon et al. | |
| 6,157,829 A | 12/2000 | Grube et al. | |
| 6,184,829 B1 | 2/2001 | Stilp | |
| 6,185,426 B1 | 2/2001 | Alperovich et al. | |
| 6,208,854 B1 | 3/2001 | Roberts et al. | |
| 6,208,866 B1 | 3/2001 | Rouhollahzadeh et al. | 455/456.5 |
| 6,229,477 B1 | 5/2001 | Chang et al. | |
| 6,233,329 B1 | 5/2001 | Urban et al. | 379/142.1 |
| 6,259,405 B1 | 7/2001 | Stewart | |
| 6,311,069 B1 | 10/2001 | Havinis et al. | |
| 6,317,718 B1 | 11/2001 | Fano | |
| 6,321,092 B1 | 11/2001 | Fitch et al. | 455/456.5 |
| 6,324,396 B1 | 11/2001 | Vasa et al. | |
| 6,332,127 B1 | 12/2001 | Bandera et al. | |
| 6,353,664 B1 | 3/2002 | Cannon et al. | |
| 6,377,810 B1 | 4/2002 | Geiger et al. | |
| 6,385,591 B1 | 5/2002 | Mankoff | |
| 6,414,635 B1 | 7/2002 | Stewart et al. | |
| 6,418,308 B1 | 7/2002 | Heinonen et al. | |
| 6,421,441 B1 | 7/2002 | Dzuban | |
| 6,427,073 B1 | 7/2002 | Kortesalmi et al. | 455/414.1 |
| 6,442,391 B1 | 8/2002 | Johansson et al. | |
| 6,442,687 B1 | 8/2002 | Savage | |
| 6,449,497 B1 | 9/2002 | Kirbas et al. | |
| 6,463,533 B1 | 10/2002 | Calamera et al. | |
| 6,470,378 B1 | 10/2002 | Tracton et al. | |
| 6,470,447 B1 | 10/2002 | Lambert et al. | |
| 6,473,626 B1 | 10/2002 | Nevoux et al. | |
| 6,477,382 B1 | 11/2002 | Mansfield et al. | |
| 6,484,148 B1 | 11/2002 | Boyd | |
| 6,496,931 B1 | 12/2002 | Rajchel et al. | |
| 6,505,046 B1 | 1/2003 | Baker | 455/456.3 |
| 6,505,048 B1 | 1/2003 | Moles et al. | |
| 6,505,049 B1 | 1/2003 | Dorenbosch | |
| 6,505,163 B1 | 1/2003 | Zhang et al. | |
| 6,522,876 B1 | 2/2003 | Weiland | |
| 6,526,275 B1 | 2/2003 | Calvert | |
| 6,545,596 B1 | 4/2003 | Moon | |
| 6,546,257 B1 | 4/2003 | Stewart | 455/456.3 |
| 6,560,442 B1 | 5/2003 | Yost et al. | |
| 6,560,461 B1 | 5/2003 | Fomukong et al. | |
| 6,594,482 B1 | 7/2003 | Findikli et al. | |
| 6,618,474 B1 | 9/2003 | Reese | 379/142.17 |
| 6,618,593 B1 | 9/2003 | Drutman et al. | |
| 6,622,016 B1 | 9/2003 | Sladek et al. | |
| 6,628,928 B1 | 9/2003 | Crosby et al. | |
| 6,628,938 B1 | 9/2003 | Rachabathuni et al. | |
| 6,640,184 B1 | 10/2003 | Rabe | |
| 6,647,257 B2 | 11/2003 | Owensby | 455/414.1 |
| 6,647,269 B2 | 11/2003 | Hendrey et al. | |
| 6,650,901 B1 | 11/2003 | Schuster et al. | |
| 6,662,014 B1 | 12/2003 | Walsh | 455/456.2 |
| 6,675,017 B1 | 1/2004 | Zellner et al. | |
| 6,677,894 B2 | 1/2004 | Sheynblat et al. | |
| 6,678,265 B1 * | 1/2004 | Kung et al. | 370/352 |
| 6,732,101 B1 | 5/2004 | Cook | 707/10 |
| 6,738,808 B1 | 5/2004 | Zellner et al. | |
| 6,754,504 B1 | 6/2004 | Reed | |
| 6,799,049 B1 | 9/2004 | Zellner et al. | |
| 6,819,929 B2 | 11/2004 | Antonucci et al. | |
| 6,829,475 B1 | 12/2004 | Lee et al. | |
| 6,850,758 B1 | 2/2005 | Paul et al. | |
| 6,867,733 B2 | 3/2005 | Sandhu et al. | |
| 6,868,074 B1 | 3/2005 | Hanson | 370/328 |
| 6,874,011 B1 | 3/2005 | Spielman | 709/206 |
| 6,876,858 B1 | 4/2005 | Duvall et al. | |
| 6,937,869 B1 | 8/2005 | Rayburn | |
| 6,954,147 B1 | 10/2005 | Cromer et al. | |
| 6,975,874 B1 * | 12/2005 | Bates et al. | 455/456.6 |
| 7,005,985 B1 | 2/2006 | Steeves | 340/572.1 |
| 7,023,995 B2 | 4/2006 | Olsson | |
| 7,069,319 B2 | 6/2006 | Zellner et al. | |
| 7,085,555 B2 | 8/2006 | Zellner et al. | |
| 7,103,368 B2 | 9/2006 | Teshima | 455/456.3 |
| 7,110,749 B2 | 9/2006 | Zellner et al. | |
| 7,116,977 B1 | 10/2006 | Moton et al. | |
| 7,181,225 B1 | 2/2007 | Moton et al. | |
| 2001/0034709 A1 | 10/2001 | Stoifo et al. | |
| 2002/0052781 A1 | 5/2002 | Aufricht et al. | |
| 2002/0077083 A1 | 6/2002 | Zellner et al. | |
| 2002/0077084 A1 | 6/2002 | Zellner et al. | |
| 2002/0077118 A1 | 6/2002 | Zellner et al. | |
| 2002/0077130 A1 | 6/2002 | Owensby | |
| 2002/0077897 A1 | 6/2002 | Zellner et al. | |
| 2002/0102993 A1 | 8/2002 | Hendrey et al. | |
| 2002/0107027 A1 | 8/2002 | O'Neil | |
| 2004/0205198 A1 | 10/2004 | Zellner et al. | |
| 2005/0272445 A1 | 12/2005 | Zellner | |
| 2006/0094447 A1 | 5/2006 | Zellner | |
| 2006/0105784 A1 | 5/2006 | Zellner et al. | |
| 2007/0042789 A1 | 2/2007 | Moton et al. | 455/456.1 |

FOREIGN PATENT DOCUMENTS

| | | |
|---|---|---|
| WO | WO 98/19484 | 5/1998 |
| WO | WO 99/27716 | 6/1999 |
| WO | PCT/US01/22295 | 7/2001 |

OTHER PUBLICATIONS

U.S. Appl. No. 11/298,149, entitled "System and Method for Using Location Information to Execute an Action" filed Dec. 9, 2005, Inventors: Robert T. Moton Jr.; Mark J. Enzmann; and Samuel N. Zellner.

U.S. Appl. No. 11/300,694, entitled "System and Method for Using Location Information to Execute an Action" filed Dec. 15, 2005, Inventor: Samuel N. Zellner.

U.S. Official Action dated Mar. 10, 2006 cited in U.S. Appl. No. 11/252,039.
U.S. Official Action dated Feb. 24, 2006 cited in U.S. Appl. No. 09/630,134.
U.S. Official Action dated Apr. 21, 2006 cited in U.S. Appl. No. 11/322,531.
U.S. Appl. No. 11/516,164, entitled "System and Method for Using Location Information to Execute an Action," filed Sep. 6, 2006, Inventors: Samuel N. Zellner; Mark J. Enzmann; and Robert T. Moton Jr.
U.S. Appl. No. 11/522,239, entitled "System and Method for Using Location Information to Execute an Action," filed Sep. 15, 2006, Inventors: Samuel N. Zellner.
U.S. Appl. No. 11/187,347, entitled "Location-Based Security Rules," filed Jul. 21, 2005, Inventors: Samuel N. Zellner.
U.S. Appl. No. 11/406,881, entitled "Location Blocking Service From a Wireless Service Provider," filed Apr. 19, 2006, Inventors: Samuel N. Zellner; Mark J. Enzmann, Robert T. Moton, Jr.
U.S. Appl. No. 09/740,375, entitled "Identity Blocking Service From a Web Advertiser," filed Dec. 19, 2000, Inventors: Samuel N. Zellner; Mark J. Enzmann, Robert T. Moton, Jr.
U.S. Appl. No. 11/322,531, entitled "Location Blocking Service From a Web Advertiser," filed Dec. 30, 2005, Inventors: Samuel N. Zellner; Mark J. Enzmann, Robert T. Moton, Jr.
U.S. non-final Official Action dated Apr. 22, 2005 in U.S. Appl. No. 09/739,340.
U.S. final Official Action dated Apr. 8, 2005 in U.S. Appl. No. 09/739,162.
U.S. non-final Official Action dated Jun. 7, 2005 in U.S. Appl. No. 09/630,134.
U.S. non-final Official Action dated Sep. 6, 2006 cited in U.S. Appl. No. 09/630,134.
U.S. final Official Action dated Jul. 26, 2005 cited in U.S. Appl. No. 09/740,414.
U.S. non-final Official Action dated Oct. 4, 2005 cited in U.S. Appl. No. 10/819,940.
U.S. non-final Official Action dated Dec. 19, 2005 cited in U.S. Appl. No. 09/740,375.
U.S. non-final Official Action dated Feb. 6, 2006 cited in U.S. Appl. No. 09/740,375.
U.S. final Official Action dated May 19, 2006 cited in U.S. Appl. No. 09/740,375.
BellSouth "The Real Yellow Pages", Greater Atlanta A-L, 2004 BellSouth Advertising & Publishing Corp.
BellSouth "The Real Yellow Pages", Greater Atlanta M-Z, 2004 BellSouth Advertising & Publishing Corp.
U.S. non-final Official Action dated Oct. 5, 2006 in U.S. Appl. No. 11/298,149.
U.S. Appl. No. 11/528,782, entitled "System and Method for Using Location Information to Execute an Action," filed Sep. 28, 2006, Inventors: Robert T. Moton, Jr. et al.
U.S. Appl. No. 11/589,688, filed Oct. 30, 2006, entitled "Location Query Service for Wireless Networks".
U.S. non-final Official Action dated Dec. 15, 2006 in U.S. Appl. No. 11/522,239.
U.S. non-final Official Action dated Jan. 9, 2007 in U.S. Appl. No. 11/406,881.
U.S. final Official Action dated Jan. 11, 2007 in U.S. Appl. No. 11/322,531.
U.S. non-final Official Action dated Jan. 16, 2007 in U.S. Appl. No. 11/187,347.
U.S. final Official Action dated Feb. 6, 2007 in U.S. Appl. No. 11/252,039.
U.S. final Official Action dated Apr. 2, 2007 in U.S. Appl. No. 09/630,134.
U.S. non-final Official Action dated Apr. 6, 2007 in U.S. Appl. No. 11/298,419.
"Wireless Application Protocol", Wireless Internet Today, pp. 1-20, 1999.
Mark Moeglein et al., An Introduction to Snap Track Server-Aided GPS Technology, available at http://www.snaptrack.com/atwork.html, undated.
"Signal Soft Wireless Location Services" available at http://www.signalsoftcorp.com/products/location_manager.html, undated.
Microsoft Mobility Developer Conference 2003.
3rd Generation Partnership Project: Technical Specification Group Services and System Aspects; Functional Stage 2 Description of Location Services in UTMS (1999).
"Open Wave Announces Availability to End-to-End Set of Location Services for Wireless Internet", Apr. 8, 2004, http://www.openwave.com/us/news_room/press_releases/2001/20010320.
Co-pending U.S. Appl. No. 09/739,315 filed Dec. 19, 2000.
Co-pending U.S. Appl. No. 09/630,134 filed Aug. 1, 2000.
Co-pending U.S. Appl. No. 09/739,162 filed Dec. 19, 2000.
Co-pending U.S. Appl. No. 09/739,340 filed Dec. 19, 2000.
Co-Pending U.S. Appl. No. 10/704,775 filed Nov. 12, 2003.
Co-pending U.S. Appl. No. 09/740,372 filed Dec. 19, 2000.
Co-pending U.S. Appl. No. 09/740,414 filed Dec. 19, 2000.
Official Action dated May 16, 2003 in U.S. Appl. No. 09/740,372.
Official Action dated Oct. 30, 2003 in U.S. Appl. No. 09/740,372.
Official Action dated Apr. 15, 2004 in U.S. Appl. No. 09/740,372.
Final Official Action dated Nov. 2, 2004 in U.S. Appl. No. 09/740,372.
Official Action dated Nov. 10, 2003 in U.S. Appl. No. 09/740,414.
Final Official Action dated Apr. 21, 2004 in U.S. Appl. No. 09/740,414.
Official Action dated Oct. 5, 2004 in U.S. Appl. No. 09/740,414.
Official Action dated Jun. 21, 2004 in U.S. Appl. No. 09/739,315.
Final Official Action dated Feb. 9, 2005 in U.S. Appl. No. 09/739,315.
Official Action dated Nov. 10, 2003 in U.S. Appl. No. 09/739,162.
Official Action dated Mar. 9, 2004 in U.S. Appl. No. 09/739,162.
Official Action dated Sep. 9, 2004 in U.S. Appl. No. 09/739,162.
Official Action dated Feb. 12, 2003 in U.S. Appl. No. 09/630,134.
Final Official Action dated Jul. 10, 2003 in U.S. Appl. No. 09/630,134.
Official Action dated Jun. 7, 2004 in U.S. Appl. No. 09/630,134.
Official Action dated Jan. 13, 2005 in U.S. Appl. No. 09/630,134.
Official Action dated Mar. 12, 2004 in U.S. Appl. No. 09/739,340.
Official Action dated Dec. 10, 2004 in U.S. Appl. No. 09/739,340.
U.S. Official Action dated Aug. 30, 2005 in U.S. Appl. No. 10/704,775.
Co-pending U.S. Appl. No. 11/252,039 filed Oct. 17, 2005.
U.S. Official Action dated Mar. 1, 2004 cited in U.S. Appl. No. 09/740,375.
U.S. Final Official Action dated Sep. 24, 2004 cited in U.S. Appl. No. 09/740,375.
U.S. Official Action dated Feb. 28, 2005 cited in U.S. Appl. No. 09/740,375.
U.S. Final Official Action dated Jul. 26, 2005 cited in U.S. Appl. No. 09/740,375.
Petronis, Scott, "Mapping Technology: The Common Thread," Wireless Review, vol. 17, No. 3, pp. 10-14, Feb. 1, 2000, ISSN: 1099-9248.
U.S. Official Action dated May 7, 2003 cited in U.S. Appl. No. 09/740,373.
U.S. Final Official Action dated Oct. 21, 2003 cited in U.S. Appl. No. 09/740,373.
U.S. Official Action dated Jan. 26, 2004 cited in U.S. Appl. No. 09/740,373.
U.S. Official Action dated Apr. 28, 2005 cited in U.S. Appl. No. 09/740,373.
U.S. Official Action dated Nov. 21, 2005 cited in U.S. Appl. No. 09/740,414.
U.S. Official Action dated Dec. 13, 2005 cited in U.S. Appl. No. 09/740,372.
U.S. Official Action dated Feb. 3, 2006 cited in U.S. Appl. No. 09/739,315.
U.S. Appl. No. 11/637,369, filed Dec. 12, 2006, entitled "Surveying Wireless Device Users by Location".
U.S. Appl. No. 11/959,283 filed Dec. 18, 2007, entitled "Location-Based Security Rules".

U.S. Final Office Action dated Jul. 19, 2007 in U.S. Appl. No. 11/298,149.
U.S. Final Office Action dated Sep. 10, 2007 in U.S. Appl. No. 11/522,239.
U.S. Office Action dated Sep. 12, 2007 in U.S. Appl. No. 11/406,881.
U.S. Office Action dated Sep. 13, 2007 in U.S. Appl. No. 11/252,039.
U.S. Final Office Action dated Nov. 15, 2007 cited in U.S. Appl. No. 11/298,419.
U.S. Office Action dated Dec. 31, 2007 cited in U.S. Appl. No. 11/528,782.

* cited by examiner

ANONYMOUS LOCATION SERVICE FOR WIRELESS NETWORKS

CROSS REFERENCE TO RELATED APPLICATION

This is a continuation of U.S. patent application Ser. No. 10/819,940, filed Apr. 8, 2004 now U.S. Pat. No. 7,069,319; which in turn is a continuation of U.S. patent application Ser. No. 09/606,535, filed Jun. 30, 2000 and now U.S. Pat. No. 6,738,808.

BACKGROUND

1. Field of the Invention

The present invention relates to the field of wireless networks, and in particular, to wireless networks that track the location and identity of wireless network devices.

2. Background of the Invention

Enhanced wireless 911 (E911) services help ensure that wireless telephones provide 911 call centers, or Public Safety Answering Points (PSAPs), with vital information necessary to locate and identify a caller in an emergency. To comply with E911 standards promulgated by the Federal Communications Commission (FCC), wireless network providers will soon be required to track the location and identity information of all wireless callers, with the purpose of providing such information to emergency personnel when a caller dials 911 from a wireless telephone. The FCC's wireless E911 rules require certain Commercial Mobile Radio Services (CMRS) carriers to begin transmission of enhanced location and identity information in two phases. Phase I requires carriers to transmit a caller's telephone number and general location to a PSAP. Phase I1 requires carriers to provide more precise location information to the PSAP.

Under the FCC rules, wireless networks and the corresponding wireless handheld devices, such as cellular telephones, will provide both the identity and location of the caller to a 911 dispatcher. To provide a caller's identity, the wireless handheld device will furnish a device identification, e.g., a mobile identification number (MIN), indicating in most instances the telephone number of the device. The wireless network and wireless handheld devices will provide the location of callers using a network-based location system (e.g., triangulation), global positioning systems (GPSs) within the handheld devices, or a combination of the two systems.

In emergency situations, quickly communicating this location and identity information is an invaluable, life-saving tool. Indeed, although the location and identity information is generally perceived as private information, the public policy behind the E911 regulations favors disclosing such private information in hopes of administering the aid a caller needs in an emergency. However, outside of emergencies, most cellular device users view their location and identity information as intimately private, and express strong reservations against involuntary and automatic disclosures such information.

These reservations are not without merit, as wireless network providers have several ways to exploit the location and identity information of network users. For example, a network provider could furnish a retailer with the identities of network users near the retailer's store, so that the retailer, in turn, could send an advertisement to the devices of the nearby network users, encouraging them to stop in and shop at the store. Knowing the identity of a network user, the retailer could also access profiling information on the user from data sources such as auxiliary marketing databases or historical databases chronicling previous business with the user. The profiling information would allow the retailer to provide targeted advertisements that are more likely to attract the user's business. However, in providing the identity information necessary for these targeted advertisements, the wireless network provider risks offending the network users with a significant invasion of privacy.

The wireless network provider therefore faces a dilemma in satisfying two customers with opposing interests: 1) the network users who desire reasonable privacy, and 2) the content providers (e.g., businesses and advertisers) who aim to appeal to the network users by obtaining as much information about the network users as possible. Thus, to appease both customers, a wireless network provider must provide enough information to content providers to promote effective content delivery and advertising, but at the same time must limit such information to guard the network users' privacy.

SUMMARY OF THE INVENTION

The present invention is an anonymous location wireless network service for use in a wireless network that tracks the location and identity of network users, such as networks complying with the E911 standards. The anonymous location wireless network service provides content providers (e.g., businesses and advertisers) with the location information of network users without revealing the identity of those network users. The service enables content providers to deliver (or "push") advertisements that appeal to a certain class of network users based on location. For example, a class of network users could include users in locations convenient to the business's store or to users who have similar interests and who assemble in a single location, e.g., fans attending a sporting event at a stadium. The service also enables network users to query content providers to obtain information about the local area from which they are transmitting (referred to herein as "pull messaging"). Most importantly though, with either push or pull messaging, the service prevents the content provider from learning the identity of a network user and maintains this vital information in strict privacy.

In a preferred embodiment of the present invention, the anonymous location wireless network service includes a wireless network having a proxy server, a network communication link to a plurality of web sites, and a wireless communication link to a plurality of handheld devices. The proxy server includes a memory storage, as an integral or separate component, for storing the device identifications (e.g., MINs—mobile identification numbers) and dummy identifications of network users.

To provide location information, the overall system architecture of the present invention includes a location system. The location system provides the wireless network with position coordinates of a handheld device that indicate where a network user is located. The location system can be a part of the wireless network, can be contained in the handheld devices, or can be a combination of the two. In the preferred embodiment of the present invention, the location system is both a part of the wireless network and is also contained in the handheld devices. For example, a suitable method of determining location as a part of the wireless network is by a Wireless Access Protocol (WAP) location service, or perhaps by triangulation across cell sites or cell sectors. An example of a suitable location system in the handheld devices is a GPS.

In the preferred embodiment of the present invention, the proxy server performs the identity blocking function. Preferably, the proxy server reads the location and identity information of network users, generates a dummy identification, relates the dummy identification to the identity information, stores the relationship in the memory storage, and forwards the location information and dummy identification to the content provider in the global computer network. Upon receiving return messages from the global computer network, the proxy server reads the dummy identification, looks up the related identity information in the memory storage, and forwards the data to the appropriate network user.

As an alternate preferred embodiment of the present invention, instead of using a different dummy identification for the device identification of each device, the dummy identification corresponds to the location of the device. Thus, the proxy server substitutes the location of a device for the identity information and stores the relationship between the device location and device identification in memory. The substituted location could be the same for multiple devices. In this manner, the content provider's response would be a different content addressed to each location. In turn, the proxy server would look up in the memory storage the devices marked with the location to which the content provider addressed the content, would determine the corresponding device identification of each device marked with the location, and would return each different content to the corresponding devices.

In blocking identity, the proxy server acts as an intermediary between the plurality of handheld devices and the global computer network to provide security, administrative control, and caching service (e.g., caches material from popular web sites to reduce access times). Preferably, the proxy server is associated with or is part of a gateway server that separates the wireless network from the Internet. The proxy server could also be associated with a firewall server that separates the wireless network from the public network.

The proxy server communicates with the plurality of handheld devices through the wireless communication link. The proxy server provides routing selection (i.e., what transport bearer is to be used), access control, addressing, protocol conversion (i.e., WML text to WML binary), caching, and transport interface between wireless and wired networks (e.g., WAP stack to traditional IP stack, HTTP/TCP/IP). The proxy server runs one or more of the general operating systems, such as Windows 95™, Macintosh™, or UNIX™.

Accordingly, it is an object of the present invention to block identity information on wireless networks that track location and identity information, such as wireless networks that comply with E911 standards.

Another object of the present invention is to provide content providers (e.g., businesses and advertisers) with the location information of wireless network users without revealing the identity of those network users.

Another object of the present invention is to protect the identity of wireless network users while still providing a content provider with enough information to promote effective targeted content delivery (e.g., advertising).

Another object of the present invention is to allow wireless network users to query content providers for information relating to a particular location without revealing their identities.

These and other objects of the present invention are described in greater detail in the detailed description of the invention, the appended drawings, and the attached claims.

DETAILED DESCRIPTION OF THE INVENTION

The present invention is an anonymous location service for use in a wireless network that tracks the location and identity of network users. The anonymous location service blocks the identity of a network user and provides only location information to a content provider. The present invention contemplates future enhanced digital cellular networks, in which network users will use digital cellular handheld devices to access data from a global computer network, and in which digital cellular network providers will track the identity and location of each network user.

Figure 1:
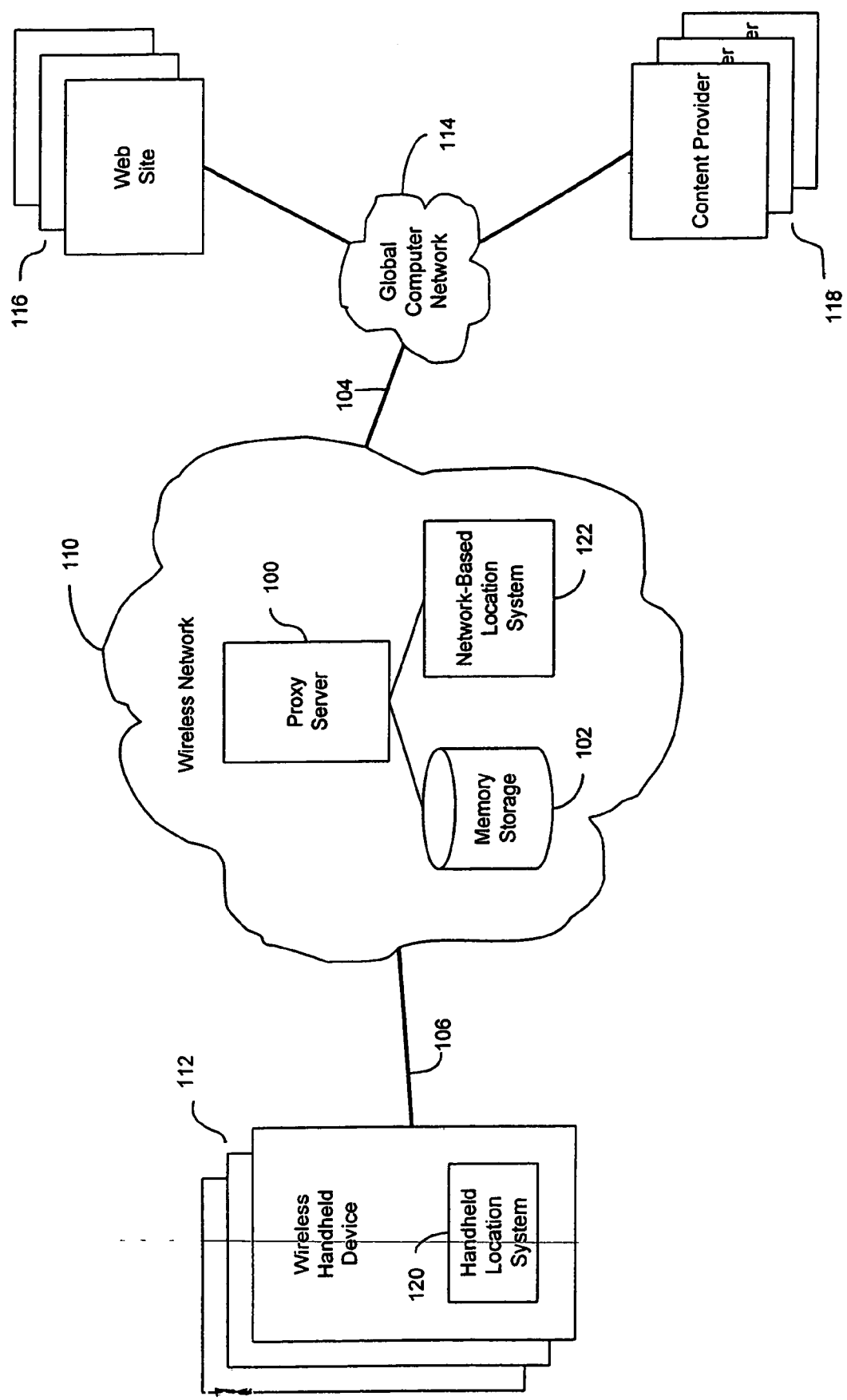
FIG. 1 is a schematic diagram of a system architecture that provides the anonymous location service according to a preferred embodiment of the present invention.

Referring to FIG. 1, the primary components of the present invention include a proxy server 100, memory storage 102, a network communication link 104 to a plurality of web sites, and a wireless communication link 106 to a plurality of handheld devices 112. Each of these components is a part of a wireless network 110.

The system architecture in which the present invention operates further includes a plurality of handheld devices 112 in communication with wireless communication link 106, a global computer network 114 in communication with network communication link 104, and a plurality of web sites 116 and a plurality of content providers 118 in communication with global computer network 114. To track the location of wireless handheld devices 112, the system architecture includes one or both of handheld location systems (e.g., GPS) 120 or a network-based location system 122. Handheld location systems 120 are provisioned in wireless handheld devices 112 while network-based location system 122 is a part of wireless network 110, in communication with proxy server 100.

Proxy server 100 is essential to the present invention. Specifically, proxy server 100 receives, in conjunction with data messages, the location and identity information of wireless handheld devices 112, generates dummy identifications and substitutes the dummy identifications for the device identifications of devices 112, records the dummy identifications and their associated device identifications in memory storage 102, and forwards the data messaging with the location information and dummy identification to web sites 116 and content providers 118 via global computer network 114. On the return path, proxy server 100 receives a return data message from web sites 116 and content providers 118, reads the dummy identifications, consults memory storage 102 to determine the device identification that corresponds to the dummy identification, replaces the dummy identification with the device identification, and forwards the return data message to the appropriate wireless handheld device.

In the preferred embodiment of the present invention, proxy server 100 is a server that is dedicated to providing wireless handheld devices 112 with access to global computer network 114, and ultimately with information content available from web sites 116 and content providers 118. More preferably, proxy server 100 is a Wireless Application Protocol (WAP) server. WAP is an application environment and set of communication protocols for wireless devices designed to enable manufacturer-, vendor-, and technology-independent access to the Internet and advanced telephony services. WAP provides wireless Internet access through all digital cellular networks, giving network users a menu driven method for downloading information, such as flight schedules and bank balances, to cellular telephones from the Internet. WAP is described in WAP version 1.1, which is herein incorporated by reference in its entirety.

Memory storage 102 is a database or other memory storage device that can record relationships between device identifications (e.g., MINs) and dummy identifications. Although shown as a separate component in FIG. 1, memory storage 102 could be contained in proxy server 100.

Wireless handheld devices 112 operate over wireless network 110 and provide means by which to exchange text data. Familiar examples include interactive pagers and cellular telephones with text messaging capabilities. Preferably, devices 112 are WAP-compatible thin clients having thin browsers adapted to communicate with proxy server 100 and to access global computer network 114. Global computer network 114 is preferably the Internet.

The plurality of web sites 116 and the plurality of content providers 118 are also preferably compatible with WAP. Web sites 116 and content providers 118 communicate with devices 112 through global computer network 114 and wireless network 110. As with traditional web sites, content providers 118 and web sites 116 can transmit data to devices 112 in response to a query, or on their own initiative as a push message.

Handheld location system 120 and network-based location system 122 provide proxy server 100 with the locations of wireless handheld devices 112. Depending on the desired degree of accuracy, one or both of the location systems can be used to determine a device's location. The preferred embodiment of handheld location system 120 is individual GPSs provisioned in wireless handheld devices 112. The preferred embodiment of network-based location system 122 is a WAP location service.

With proxy server 100 providing the identity blocking function of the present invention, there are an unlimited number of applications for the anonymous location service. For clarity, set forth below are two examples of how the preferred embodiment of the present invention is implemented in different situations: 1) in response to a network user's query for information related to her location (pull messaging), or 2) in response to a content provider's desire to push messages to network users in a particular location (push messaging). In each example, proxy server 100 receives the location and identity information of wireless handheld devices 112 and forwards only the location information to web sites 116 and content providers 118 via global computer network 114. Proxy server 100 obtains the location and identity information of devices 112 by monitoring a user's accessing of the network (e.g., browsing the Internet), by querying devices 112 on its own initiative, or by querying devices 112 at the request of web sites 116 and content providers 118.

Although these examples best illustrate the identification blocking feature of the present invention, one of ordinary skill in the art would appreciate that the anonymous location service is applicable to other wireless network messaging situations in which a caller on a network that tracks location and identity wishes to keep her identity private. In addition, while the system operation described herein and illustrated in the diagrams and flowcharts contains many specific details, these specific details should not be construed as limitations on the scope of the invention, but rather as examples of preferred embodiments thereof. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

Figure 2A:
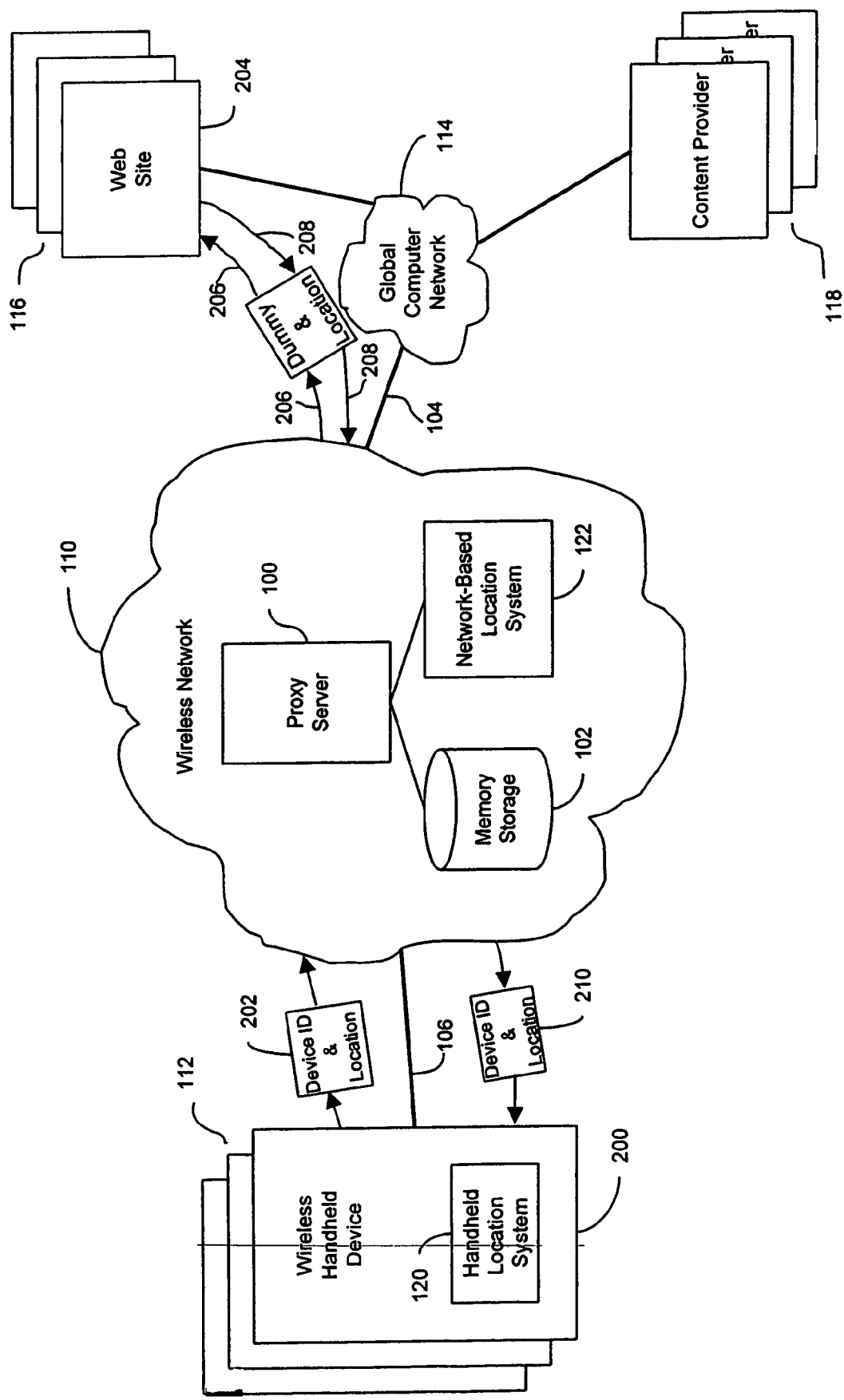
FIG. 2*a* is a schematic diagram of the system architecture illustrated in FIG. 1, showing the provision of an anonymous location service for pull messaging.
Figure 2B:
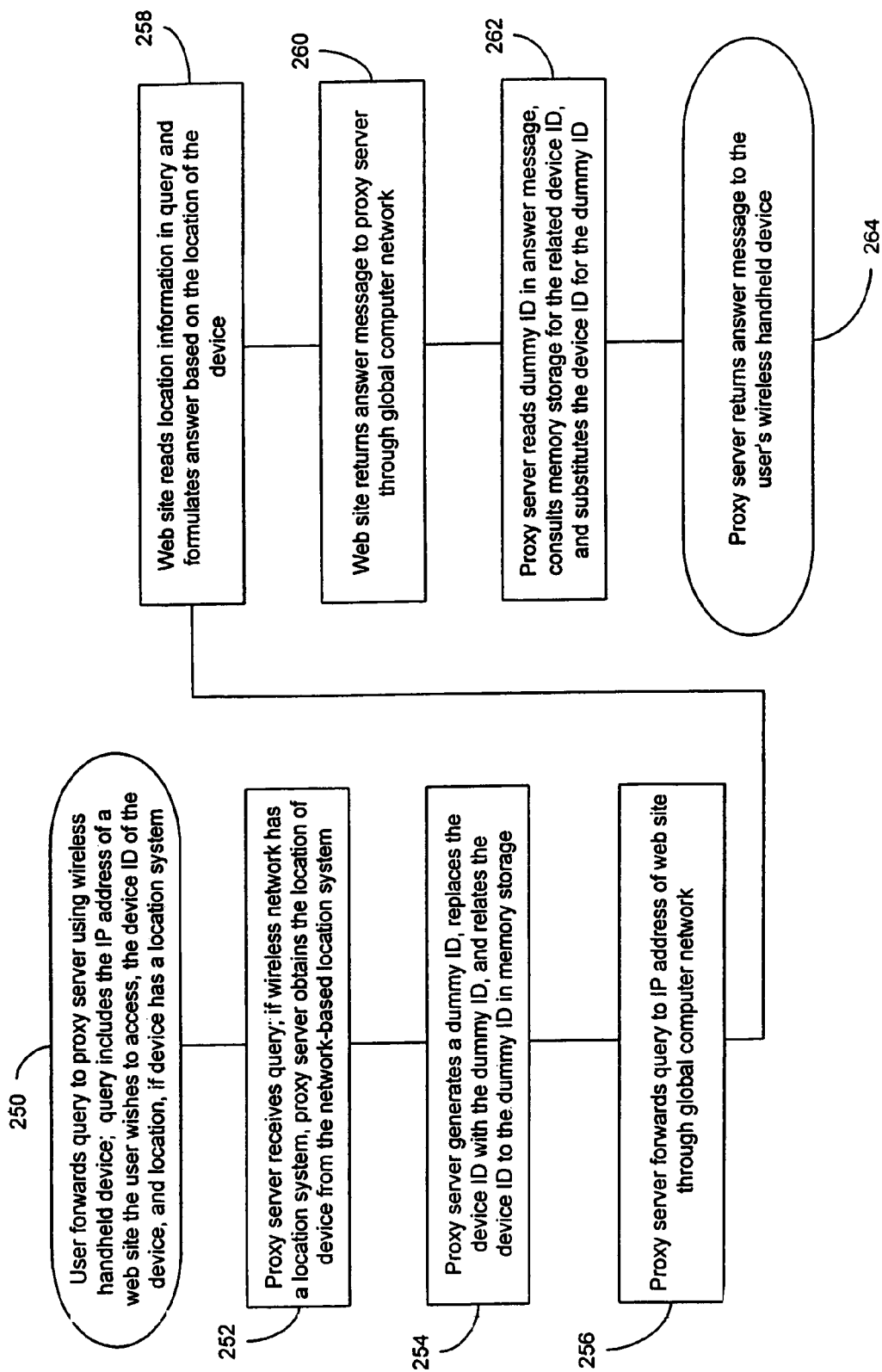
FIG. 2*b* is a flow chart corresponding to FIG. 2*a*, which traces the steps for providing anonymous location service for pull messaging.

In the case of a user query (pull messaging), as shown in FIGS. 2a and 2b, wireless handheld device 200 forwards a query 202 to proxy server 100 (step 250 in FIG. 2b). Query 202 contains the IP address of a web site 204 that the user wishes to access, the device identification of device 200, and, if device 200 includes handheld location system 120 (e.g., a GPS), the location of the device. Optionally, as shown in step 252, if the location system is a part of wireless network 110, proxy server 100, upon receipt of query 202, obtains the location of device 200 from network-based location system 122. Having the location and identity (e.g., MIN) of handheld wireless device 200, in step 254, proxy server 100 generates a dummy identification, replaces the device identification with the dummy identification, and relates the device identification to the dummy identification in memory storage 102. In step 256, proxy server 200 then forwards query 206 to the IP address of web site 204 through global computer network 114.

In step 258, the web server of web site 204 reads the location information associated with query 206 and formulates an answer based on the location of device 200. The web server of web site 204 then returns an answer message 208 to proxy server 100 through global computer network 114, in step 260. Then, in step 262, proxy server 100 reads the dummy identification in answer message 208, consults memory storage 102 for the related device identification, and substitutes the device identification for the dummy identification. Finally, in step 264, proxy server 100 returns answer message 210 to the user's device 200. Thus, by removing and replacing the device identification, proxy server 100 blocks the identity of the network user from reaching the external web server of web site 204.

Figure 2C:
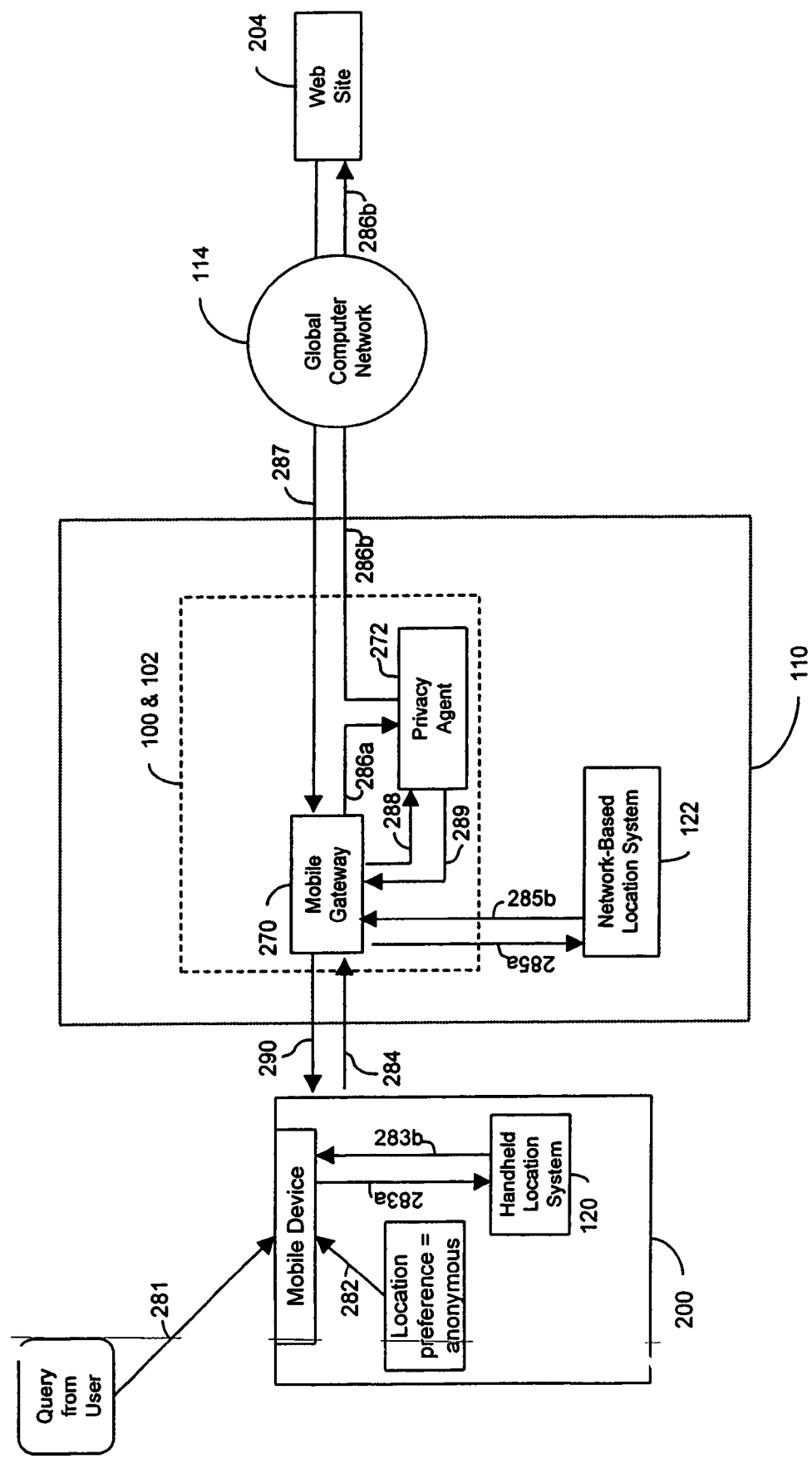
FIG. 2*c* is a schematic diagram of a specific implementation of the preferred embodiment of the anonymous location service of FIG. 2*a* for pull messaging.

FIG. 2c illustrates a specific implementation of the anonymous location service for pull messaging. This specific implementation demonstrates one example of how a web server can be blocked from receiving a user's identity, while still receiving and responding to the user's location-dependent query. As an example of a typical query, the user could ask the web server, "Tell me which restaurants are within walking distance of my current location".

As shown in FIG. 2c, the system architecture for this specific implementation corresponds generally to the architecture of FIG. 2a. The dashed lines indicate generally which components of FIG. 2a relate to those of FIG. 2c. For example, mobile gateway 270 and privacy agent 272 perform the functions of proxy server 100 and memory storage 102.

FIG. 2c also shows arrows labeled in sequence, indicating the information flow and process steps of this specific implementation. In step 281, a user initiates a query from his wireless device 200 to the web server of web site 204. The query includes a location request, a device identification for wireless device 200, and a parameter for location preference. The location preference parameter indicates whether the user wants his identity forwarded or wants to remain anonymous. In this example, the user wants to block his identity. Therefore, in step 282, wireless device 200 marks the location preference anonymous. The user can execute this anonymous setting by, for example, configuring the default preference of wireless device 200, or by selecting a manual override (e.g., a menu selection or key sequence).

If wireless device 200 includes a location system, in step 283*a*, wireless device 200 requests location information from location system 120. In step 283*b*, location system 120 provides the location information, which wireless device 200 then incorporates into the query to web site 204. If wireless device 200 does not include a location system, then wireless device 200 incorporates a location request message in the query to web site 204. In step 284, wireless device 200 sends the query to mobile gateway 270.

If wireless device 200 does not have a location system and the query includes a location request message, then, in step 285*a*, mobile gateway 270 queries network-based location system 122 for the location of wireless device 200. The query to location system 122 references the device identification of wireless device 200. In response, network-based location system 122 provides mobile gateway 270 with the location information of wireless device 200, in step 285*b*.

In step 286*a*, as mobile gateway 270 forwards the query to web site 204, privacy agent 272 intercepts the message because it is marked anonymous. In step 286*b*, privacy agent 272 replaces the device identification of wireless device 200 with a dummy identification and forwards the query message to web site 204. At the same time, privacy agent 272 records the association between the device identification and the dummy identification.

In step 287, web server 204 receives the query message via global computer network 114 and sends a response back through network 114. Web site 204 formulates the response based on the location information, and addresses the response to the dummy identification.

In step 288, mobile gateway 270 recognizes that the response message includes a dummy identification and queries privacy agent 272 for the "real" device identification of wireless device 200. In step 289, privacy agent 272 finds the device identification associated with the dummy identification and sends the device identification to mobile gateway 270. Finally, in step 290, mobile gateway 270 sends the response message to wireless device 200, as identified by the device identification.

Figure 3A:
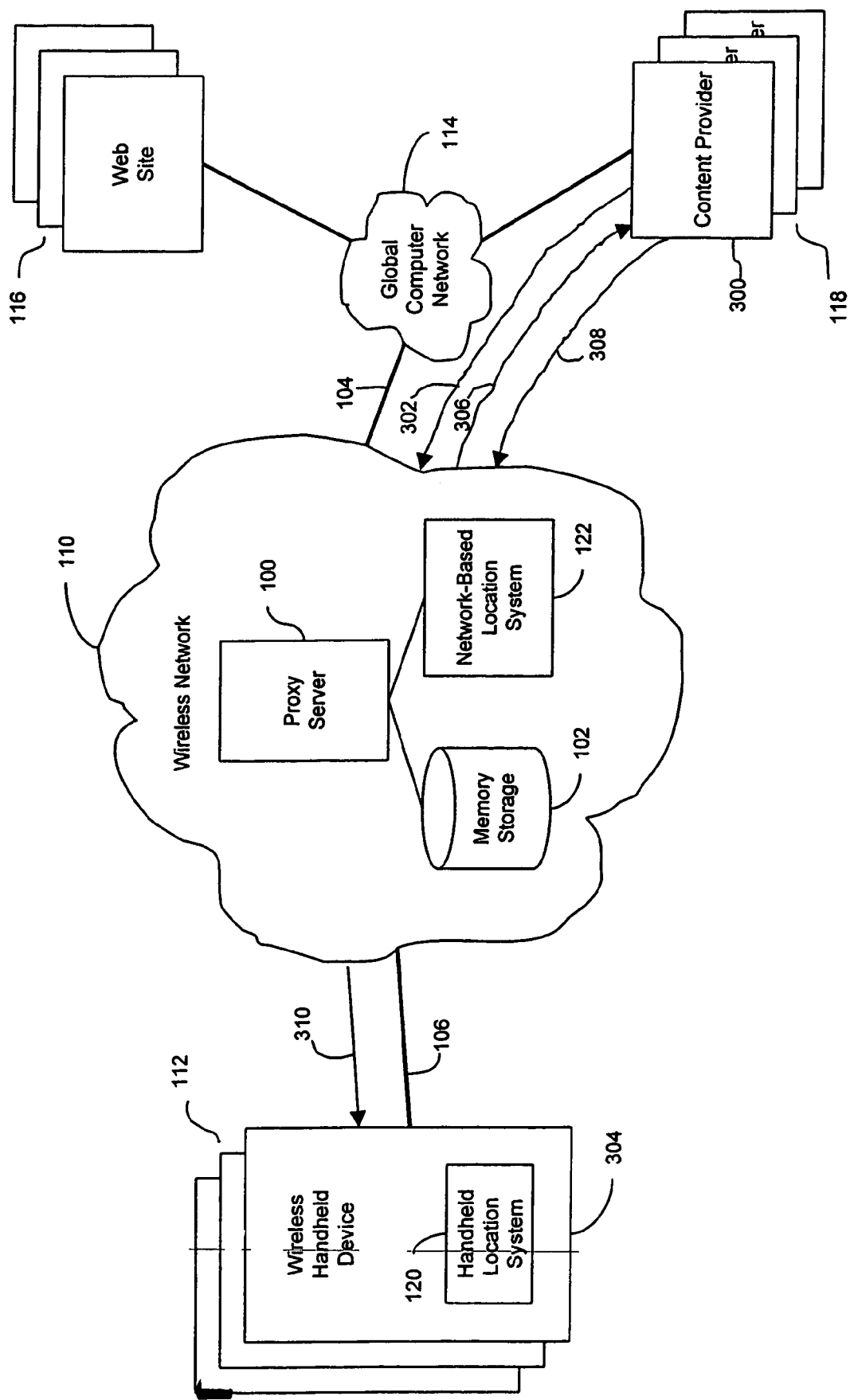
FIG. 3*a* is a schematic diagram of the system architecture illustrated in FIG. 1, showing the provision of an anonymous location service for push messaging.
Figure 3B:
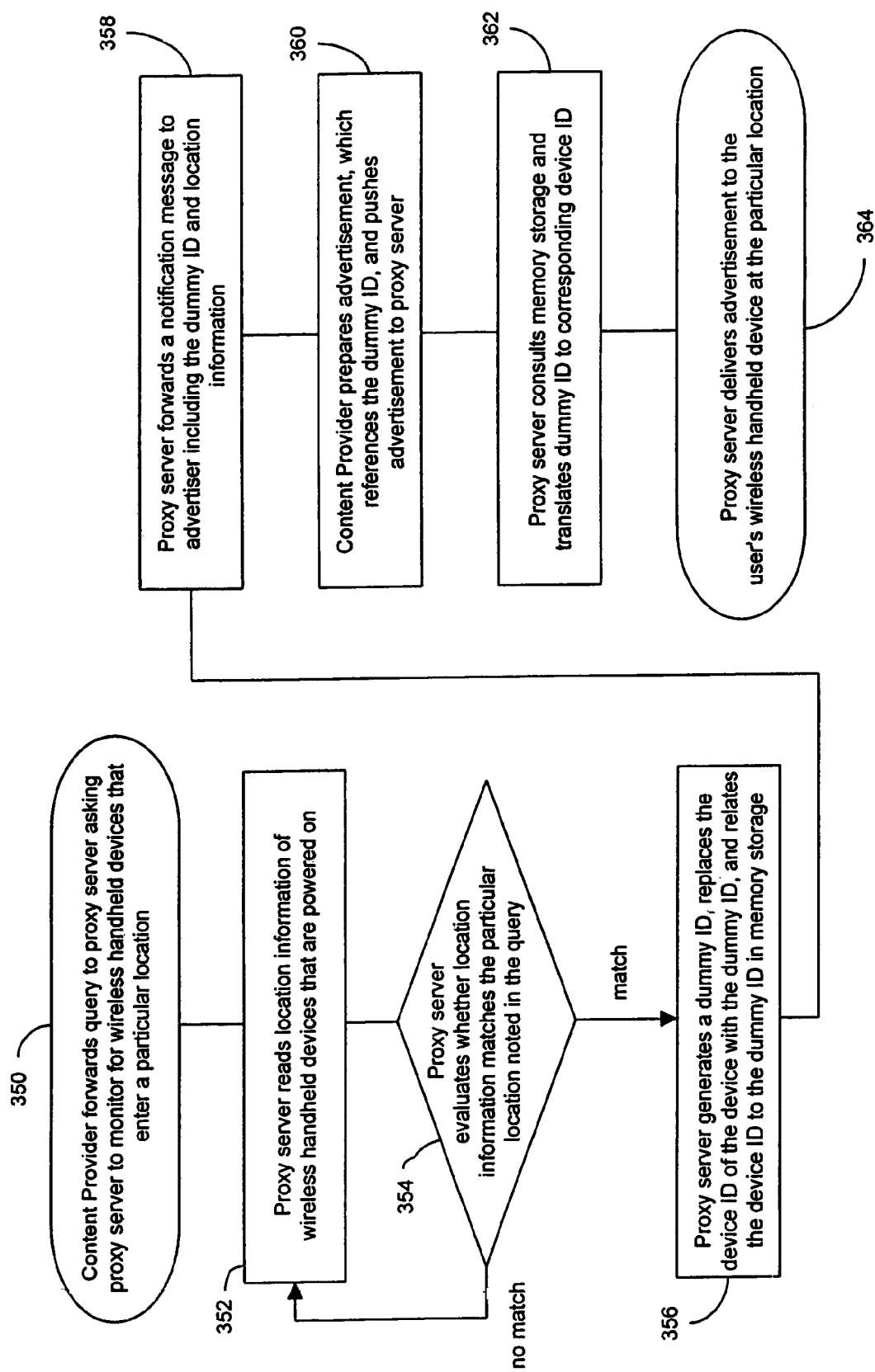
FIG. 3*b* is a flow chart corresponding to FIG. 3*a*, which traces the steps for providing anonymous location service for push messaging.

Referring to FIGS. 3*a* and 3*b*, for push messages, an external web server, from the plurality of web sites 116 or the plurality of content providers 118, delivers messages to network users in a particular location, without being prompted by user queries. For example, content provider 300 could be a typical Internet advertiser such as DoubleClick™. In such a case, as shown in step 350 in FIG. 3*b*, content provider 300 forwards a query 302 to proxy server 100 asking proxy server 100 to monitor for wireless handheld devices 112 that enter a particular location. In response, in step 352, proxy server 100 reads the location information of wireless handheld devices 112 that are powered on. Network-based location system 122, handheld location system 120, or a combination of both systems provides this location information.

As shown in step 354, proxy server 100 evaluates whether the location information it reads corresponds to the particular location noted in the query by content provider 300. When the location information matches the location corresponding to query 302, proxy server 100 substitutes a dummy identification for the device identification of the wireless handheld device 304 (step 356), as described above for the user query example. Proxy server 100 forwards a notification message 306 to content provider 300 including the dummy identification and location information, in step 358. Then, in step 360, content provider 300 prepares a content message 308 (e.g., an advertisement), which references the dummy identification, and pushes content message 308 back to proxy server 100. In step 362, proxy server 100 translates the dummy identification to its corresponding device identification by consulting memory storage 102. Finally, in step 364, proxy server 100 delivers content message 310 to wireless handheld device 304, which is associated with a network user in the desired location. Thus, proxy server 100 blocks the network user identification so that it never reaches content provider 300.

Figure 3C:
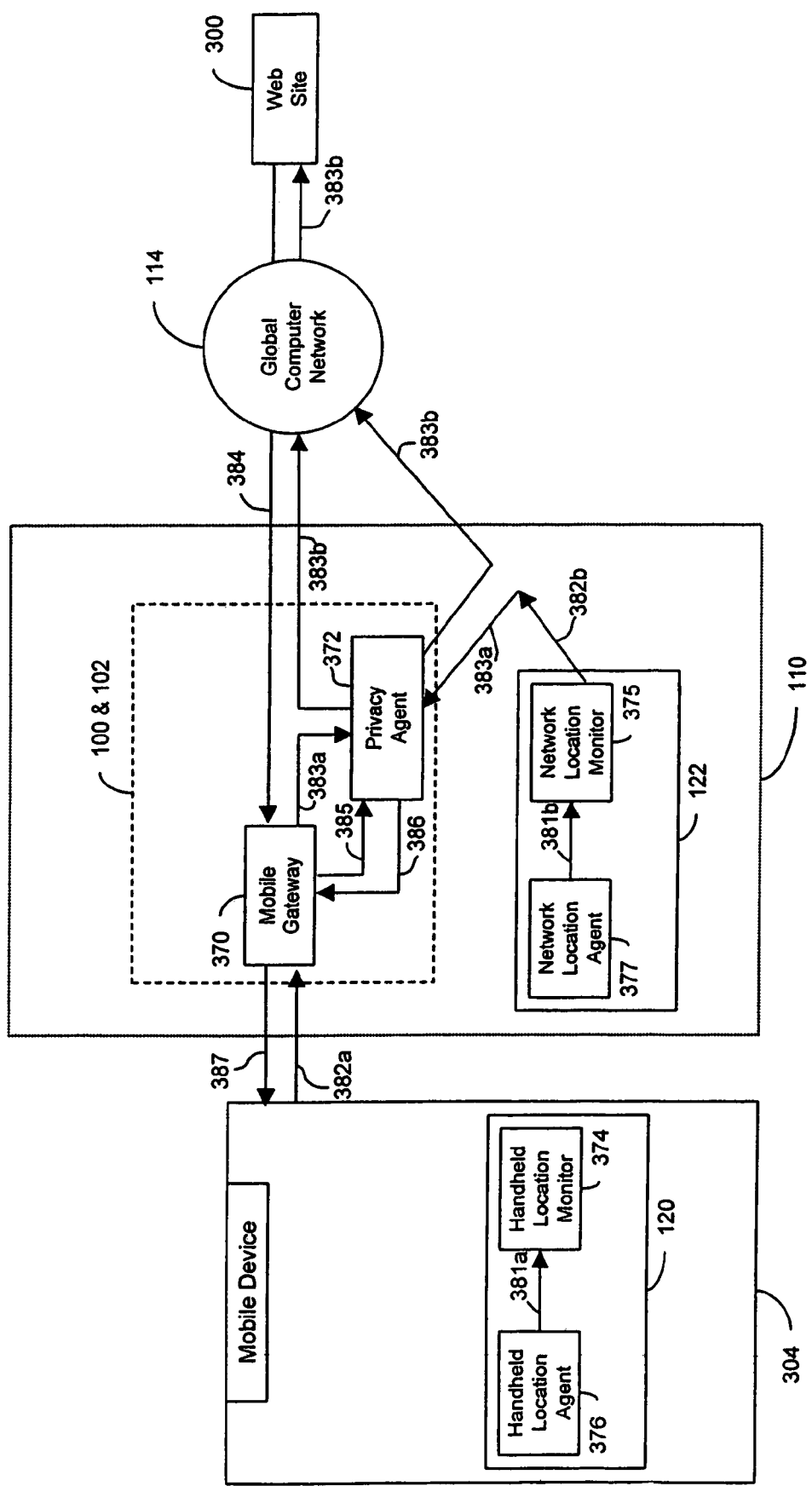
FIG. 3*c* is a schematic diagram of a specific implementation of the preferred embodiment of the anonymous location service of FIG. 2*a* for push messaging.

FIG. 3*c* illustrates a specific implementation of the anonymous location service for push messaging. This specific implementation demonstrates one example of how a web server can be blocked from receiving a user's identity, while still receiving the user's location information and forwarding location-dependent messages. As an example, the web server of content provider 304 could provide alerts or content (e.g., banner advertisements) to a wireless device when the device moves into a targeted area (e.g., a shopping mall).

As shown in FIG. 3*c*, the system architecture for this specific implementation corresponds generally to the architecture of FIG. 3*a*. The dashed lines indicate generally which components of FIG. 3*a* relate to those of FIG. 3*c*. For example, mobile gateway 370 and privacy agent 372 perform the functions of proxy server 100 and memory storage 102. In addition, as an alternative to the preferred embodiment described in FIGS. 3*a* and 3*b*, in which proxy server 100 evaluates whether location information matches a targeted area, this specific implementation monitors for a device in a targeted area using a handheld location monitor 374 in handheld location system 120 or a network location monitor 375 in network-based location system 122. To help illustrate specific processing functions, this specific implementation also includes handheld location agent 376 as a component of handheld location system 120 and network location agent 377 as a component of network-based location system 122.

FIG. 3*c* also shows arrows labeled in sequence, indicating the information flow and process steps of this specific implementation. The process begins under the assumption that wireless device 304 has chosen the anonymous identity option (i.e., the location preference parameter is equal to anonymous) and that content provider 304 has specified the targeted areas into which it wants to deliver messages to users. In step 381*a*, if wireless device 304 includes a handheld location system 120, handheld location agent 376 provides handheld location monitor 374 with the location of wireless device 304. If wireless device 304 does not include a handheld location system, network location agent 377 provides network location monitor 375 with the location of wireless device 304 in step 381*b*.

If wireless device 304 includes handheld location system 120, handheld location monitor 374 determines that wireless device 304 is within the targeted area and has chosen the anonymous option. If wireless device 304 does not include handheld location system 120, network location monitor 375 determines that wireless device 304 is within the targeted area and has chosen the anonymous option.

In step 382*a*, if wireless device 304 includes handheld location system 120, handheld location monitor 374 initiates an "in the area" message in wireless device 304 and forwards the message to content provider 300 (through mobile gateway 370). Alternately, if wireless device 304 does not include a handheld location system, in step 382b, network location monitor 374 sends an "in the area" message through global computer network 114 to content provider 300. In both steps 382a and 382b, the message also includes a device identification for wireless device 200, and a parameter for location preference. The location preference parameter indicates whether the user wants his identity forwarded or wants to remain anonymous. In this example, the location preference is marked anonymous.

In step 383a, before the message (from either wireless device 304 or network based location system 122) passes to global computer network 114, privacy agent 372 intercepts the message because it is marked anonymous. In step 383b, privacy agent 372 replaces the device identification of wireless device 200 with a dummy identification and forwards the message to content provider 300. At the same time, privacy agent 372 records the association between the device identification and the dummy identification.

In step 384, content provider 300 receives the "in the area" message via global computer network 114 and sends a response (e.g., an alert or content) back through network 114. Web site 204 formulates the response based on the location information, and addresses the response to the dummy identification.

In step 385, mobile gateway 370 recognizes that the response message includes a dummy identification and queries privacy agent 372 for the "real" device identification of wireless device 304. In step 386, privacy agent 372 finds the device identification associated with the dummy identification and sends the device identification to mobile gateway 370. Finally, in step 387, mobile gateway 370 sends the response message to wireless device 304, as identified by the device identification.

FIG. 3c illustrates alternative preferred embodiments of communicating location information to an outside party, e.g., content provider 300. As shown, the communication could be between mobile gateway 370 and content provider 300 or could be between network-based location system 122 and content provider 300. As one of ordinary skill in the art would appreciate, many other solutions to providing this communication are possible, e.g., by direct communication between wireless device 304 and content provider 300.

In the push implementation, proxy server 100 monitors wireless handheld devices 112 that are powered on. In most instances, a network user simply turns on his wireless handheld device and leaves the network interface open to a web page. The initial accessing of the web page or the completion of any other wireless transmission (e.g., placing of a wireless telephone call) provides proxy server 100 with location and identity information. In addition, each time the web page automatically refreshes, or each time the network user enters a browse command, proxy server 100 receives updated location information. In this manner, proxy server 100 can continually monitor for devices that enter a location to which an content provider wants to push content messages.

With regard to both push and pull messages, in most cases, proxy server 100 preferably removes identity information from a user message before the message enters global computer network 114. Removing the identity information within wireless network 110 ensures the greatest privacy, yet still accommodates generic network access needs. For example, a web site would not need the identity of a network user to provide general data, such as stock prices, television guides, and flight schedules. The web site would simply respond to a request for this public information, without regard for the identity of the requesting party.

However, in some cases, web sites must know the identity of a network user to provide private customer-specific information. For example, instead of just stock prices, a network user may want to view the performance of his particular stock portfolio. The web site administering his portfolio would need to know his identity to access the correct portfolio data and to provide the data in a secured transaction. Presumably, the network user would authorize the web site to receive his identity information under the condition that his identity not be passed on to other web sites. However, conflicting with this conditional authorization, these same web sites often sell advertisements off of their web pages in the form of banner ads. Typically, when the network user opens a web page with a banner ad, the web site calls out to the advertiser to have an advertisement downloaded. In this exchange, the advertisers, seeking to maximize effectiveness, ask the web sites for as much information about the network user as possible, including location and identity. The danger is that the web site will relinquish this private identity information to the advertiser.

Figure 4:
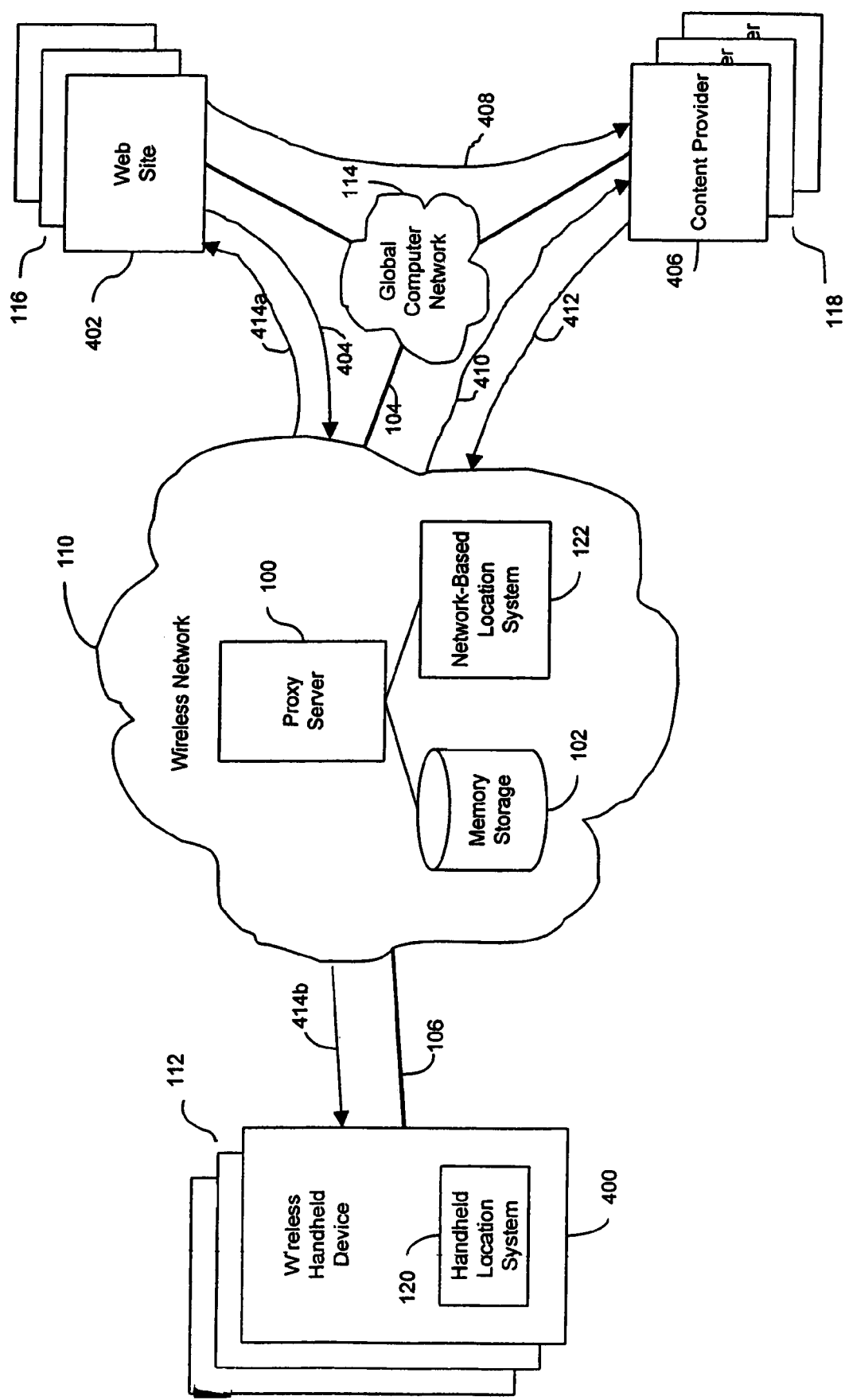
FIG. 4 is a schematic diagram of an alternate embodiment of the system architecture illustrated in FIG. 1, in which the proxy server is used to control the delivery of web page banner advertisements.

FIG. 4 illustrates an alternate preferred embodiment of the present invention that prevents this breach of privacy. Thus, when wireless handheld device 400 accesses web site 402 and opens a web page having a banner ad, web site 402 calls out to proxy server 100 along path 404, instead of directly to content provider 406 along path 408. When proxy server 100 receives the request to insert a banner ad, proxy server 100 substitutes a dummy identification for the device identification, as described above, and forwards the dummy identification and location information to content provider 406 along path 410. Using the location information, content provider 406 returns a targeted content to proxy server 100 along path 412. Proxy server 100 translates the dummy identification embedded in the content into the appropriate device identification, and forwards the content and device identification to web site 402 along path 414a, for display on wireless handheld device 400 along with other content provided by web site 402. Alternately, proxy server 100 could forward the content directly to wireless handheld device 400 along path 414b. Therefore, the private identification information never passes to an unauthorized third party.

In an alternate preferred embodiment of the present invention, the dummy identification that the proxy server associates with a device identification is the location of the device. Thus, instead of using a different dummy identification for the device identification of each device, the dummy identification corresponds to a device's location, which could be the same for multiple devices. Thus, the proxy server substitutes the location of a device for the identity information and stores the relationship between the device location and device identification in memory. In this manner, the content provider's response would be a different content addressed to each location. In turn, the proxy server would look up in the memory storage the devices marked with the location to which the content provider addressed the content, would determine the corresponding device identification of each device marked with the location, and would return each different content to the corresponding devices. For example, if devices A and B are in location X and device F is in location Y, the proxy server would substitute X for the device identifications of devices A and B, and would substitute Y for the device identification of device F. In memory, the proxy server would associate the identifications of devices A and B to X and the identification of F to Y. The content provider would forward content X' addressed to X and would forward content Y addressed to Y. Then, the proxy server would read the X and Y addresses, consult the memory for device identifications associated with the X and Y addresses (locations), and forward content X' to devices A and B and content Y to device F.

Although discussed above in the context of ordinary web sites, one of ordinary skill in the art would appreciate that the present invention is applicable to communications beyond HyperText Markup Language (HTML) and Wireless Markup Language (WML). Indeed, the present invention is applicable to such communications as voice calls and video calls. The true spirit and scope of the invention should not be limited to the web site embodiments described above, but instead should be defined by the claims appended hereto, and by their equivalents.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for providing an anonymous location service for use in a wireless network that tracks the geographical location and identity of a wireless network user, the method comprising:
    associating a fictitious identification with identity information of the wireless network user into a relationship;
    storing the relationship in memory;
    receiving geographical information of the wireless network user;
    providing the fictitious identification in place of the identity of the wireless network user;
    providing the geographical information and the fictitious identification of the wireless network user to a web site through the global computer network
    receiving a message from the web site through a global computer network, wherein the message includes the fictitious identification;
    locating the fictitious identification in the memory;
    using the relationship to determine the identity of the wireless network user; and
    providing the message to the wireless network user.

2. The method of claim 1, wherein the identity and the geographical information of the network user are received when the network user accesses the global computer network through the wireless network.

3. The method of claim 1, wherein the identity and the geographical location information of the network user are received when the network user places a wireless telephone call.

4. A method for providing an anonymous location service for use in a wireless network that tracks the geographical location and identity of a wireless network user, the method comprising:
    receiving geographical information relating to the wireless network user;
    substituting a fictitious identification for the identity of the wireless network user; and
    in response to a message received from a web site requesting communication with wireless users in a particular geographical location, forwarding the geographical information and the fictitious identification of wireless network users in the particular geographic location to the web site through a global computer network only if the geographical information bears a predetermined relation to the particular geographical location.

5. The method of claim 4, wherein the fictitious identification is the geographical information of the wireless network device.

6. The method of claim 4, wherein receiving the geographical information is initiated when the network user accesses the global computer network through the wireless network.

7. The method of claim 4, wherein receiving the geographical information is initiated when the network user initiates a wireless telephone call.

8. A method for providing an anonymous location service for use in a wireless network that tracks the geographical location and identity of wireless network users, the method comprising:
    receiving geographical information and an identity of a network user operating in the wireless network;
    providing the geographical information and the identity to a first web site, the first web site receiving content;
    receiving a request for content from the first web site including the geographical information and the identity of the network user;
    generating a fictitious identification and substituting the fictitious identification for the identity of the network user;
    recording an association between the fictitious identification and the identity of the network user;
    forwarding to a second web site a modified request for content including the geographical location and the fictitious identification of the network user;
    receiving from the second web site content that references the fictitious identification of the network user;
    determining the identity of the network user using the fictitious identification and the recorded association;
    replacing the fictitious identification referenced in the content with the identity of the network user; and
    forwarding the content including the geographical information and the identity of the network user.

9. The method of claim 8, wherein:
    forwarding the content comprises forwarding the content to the first web site; and further comprising:
    receiving a web page from the first web site including the content; and
    forwarding the web page to the network user.

10. A system for providing an anonymous location service for use in a wireless network that tracks geographical information and identities of wireless network users, the system comprising:
    a proxy server having memory storage and an interface operative to access a plurality of web sites; and
    wherein the proxy server receives the geographical information of the network users from a geographical location system in communication with the proxy server, receives the identities of the network users from a plurality of network users, translates the identities of the network users into fictitious identifications, and forwards the geographical information of the network users and the fictitious identifications to at least one of the plurality of web sites.

11. The system of claim 10, wherein the memory storage is a database separate from the proxy server.

12. The system of claim 10, wherein the proxy server receives the geographical information of the users from a geographical location system comprising a wireless protocol geographical location service provisioned in the wireless network.

13. The system of claim 10, wherein the proxy server stores relationships between the identities and the fictitious identifications in the memory storage.

14. The system of claim 13, wherein the proxy server receives messages from the plurality of web sites, wherein the messages reference the fictitious identifications, wherein the proxy server consults the relationships in the memory storage and uses the fictitious identifications to locate corresponding identities of network users, and wherein the proxy server forwards the messages to the corresponding identities.

15. The system of claim 10, wherein the proxy server reads the geographical information of the network users and forwards the geographical information and the fictitious identifications to the plurality of web sites only if the geographical information bears a predetermined relation to a specific geographical location requested by at least one web site.

16. The system of claim 10, wherein the proxy server comprises:

a mobile gateway for communicating with at least one web site, and a privacy agent associated with the mobile gateway to determine if the network user wants to block its identity and, if so, to translate the identity of the network user into a fictitious identification;

the mobile gateway receives the geographical location of the network user from a geographical location system, receives the identity of the network user from the network users, and forwards the geographical location of the network user to a computer network; and the privacy agent stores a relationship between the network user identity and the fictitious identity, and sends a response from the computer network to the network user related to the fictitious address.

17. The system of claim 16, further comprising a location agent that determines the geographical locations of the network devices and a geographical location monitor in communication with the location agent, and wherein the geographical location monitor determines whether the geographical locations of the network devices bear a predetermined relation to a specific geographical location requested by at least one computer network.

18. The system of claim 16, wherein the computer network comprises web sites, the geographical location monitor determines whether the geographical locations of the network devices bear a predetermined relation to a specific geographical location requested by at least one web site, and the mobile gateway receives a response message from the web site addressed to the fictitious address and sends that response to the wireless device related to the fictitious address.

19. A proxy server for providing an anonymous location service for use in a wireless network that tracks geographical locations and identities of plural wireless users over a wireless communication link, the proxy server comprising a memory storage and operating to:

receive as part of data messages, the geographical locations and the identities of the plurality of wireless users;

generate fictitious identifications and substitute the fictitious identifications for the identities;

record the fictitious identifications and their associated identities in the memory storage; and forward the data messages with the geographical locations and fictitious identifications to at least one web site via the global computer network.

20. The proxy server of claim 19, wherein:

the proxy server receives return data messages from web sites;

the proxy server reads the fictitious identifications and consults the memory storage to determine identities of the wireless users that correspond to the fictitious identifications; and the proxy server replaces the fictitious identifications with the identities of the wireless users and forwards the return data message to the corresponding wireless user.

* * * * *